3,052,543
Patented Sept. 4, 1962

3,052,543
PHOTOGRAPHIC FILM BASE AND FILM
Herbert Bauer, Metuchen, and Abraham Bernard Cohen, Springfield, N.J., assignors to E. I. du Pont de Nemours and Company, Wilmington, Del., a corporation of Delaware
No Drawing. Filed Dec. 5, 1958, Ser. No. 778,299
7 Claims. (Cl. 96—87)

This invention relates to photographic film base and to photographic film. More particularly, it relates to such base and photographic film comprising a support film composed of a modified polyester containing in the polymer chain a minor proportion of a recurring bivalent hydrocarbon unit having a metal sulfonate (M—SO$_3$—) substituent attached to a carbon atom of said unit.

It is well known that polyesters can be prepared by the esterification with a suitable glycol of a dicarboxylic acid, e.g., terephthalic acid, or by alcoholysis of esters or other terephthalic acid compounds capable of reacting with said glycols to form glycol esters (see Whinfield et al. U.S. Patent 2,465,319 of March 22, 1949). Polyesters have been prepared which contain highly polar groups such as sulfonate, sulfinate, sulfonamide, sulfochloride, and phosphate groups. Thus, in assignee's Griffing et al. U.S. application Ser. No. 622,811, filed November 19, 1956, it is disclosed that a polyester containing a sulfonate group in the form of a metal salt, the said sulfonate group being a substituent of a repeating radical and said radical comprising a minor proportion of the total of said polyester, can be prepared, preferably, from terephthalic acid or an ester-forming derivative thereof and a polymethylene glycol having the formula HO(CH$_2$)$_n$OH where $n$ is an integer of from 2 to about 10, in the presence of at least about 0.5 mole percent, based on the terephthalate content of the polyester, of a compound containing at least one polymeric ester-forming functional group together with at least one sulfonate group in the form of a metal salt. These polyesters in fiber and film form have a particular affinity toward basic dyes Photographic films having a polyester base, e.g., a highly polymeric linear polyester of a dicarboxylic acid with dihydric alcohol are described in Carothers U.S. Patent 2,216,736. These films have a disadvantage, however, that the degree of permanent adherence between such polyester films and gelatin layers is not always as high as that attained with cellulose acetate and cellulose nitrate photographic films and gelatin layers. Swindells U.S. Patent 2,698,235 of December 28, 1954, discloses that good anchorage can be obtained between the polyester photographic film base and the gelatin layers if a very thin layer of a tri-component copolymer of vinylidene chloride, an acrylic ester and itaconic acid is coated on the polyester photographic film under controlled conditions. Alles et al. U.S. Patent 2,627,088 of Feb. 3, 1953, teaches that the improved anchorage, obtained when polyester film is coated with the resin made from vinylidene chloride/acrylic ester/itaconic acid copolymer, is not affected by biaxially stretching the coated film at an elevated temperature.

An object of this invention is to provide new and improved photographic film base and photographic film. Another object is to provide such a base and film having improved anchorage between the coated layers. Still other objects will be apparent from the following description of the invention.

The photographic film base and film provided in accordance with this invention comprise (1) support film composed essentially of a polyester corresponding to the reaction product of (a) at least one dicarboxylic acid, (b) as least one dihydroxy compound of the formula HOCH$_2$—W$_n$—CH$_2$OH where W is a divalent hydrocarbon radical taken from the group consisting of unsubstituted and alkyl-substituted polymethylene radicals of 0–8 carbon atoms (e.g.

$$HOCH_2\underset{\underset{CH_3}{|}}{\overset{\overset{CH_3}{|}}{C}}CH_2OH)$$

and cycloaliphatic radicals of 5–6 carbon atoms (e.g., 1,3-cyclopentanedimethanol and 1,4-cyclohexanedimethanol) and (c) a compound of the formula $$R-Z-R'$$
$$\overset{|}{SO_3M}$$

where M is lithium, sodium, potassium, calcium or magnesium, Z is a divalent aromatic hydrocarbon, e.g., phenylene or naphthylene and biphenyl or a divalent alkylene radical of 1 to 10 carbons and R and R' are ester-forming radicals taken from the group consisting of $$-O-\overset{O}{\underset{}{\overset{\|}{C}}}-R_1, \quad -\overset{O}{\underset{}{\overset{\|}{C}}}O-H, \quad -\overset{O}{\underset{}{\overset{\|}{C}}}-O-R_1$$

—(CH$_2$)$_n$OH, —O(CH$_2$)$_n$OH,
—O(CH$_2$)$_n$—[O(CH$_2$)$_n$]$_m$—OH
and $$-\overset{O}{\underset{}{\overset{\|}{C}}}-[O(CH_2)_n]_m-OH$$

where R$_1$ is alkyl of 1 to 4 carbons, $m$ is 1 to 3 and $n$ is 2 to 4; bearing (2) at least one layer of a vinylidene chloride copolymer containing at least 35% vinylidene chloride; (3) a layer of a water-permeable colloid having protective colloid properties. In the case of the photographic film at least one water-permeable sublayer (anchor layer) will have coated thereon a light-sensitive layer preferably a layer of a dispersion of light-sensitive silver halide grains in a water-permeable organic colloid having protective colloid properties.

In the polyester component, components (a) and (b) will together constitute 90.0 to 99.5% and component (c) will constitute 0.5 to 10.0%, by weight, of the polyester. In general the glycol component will be present in excess. However, the reaction takes place essentially on a mole per mole basis of the dibasic acid and the dihydric alcohol.

The support film may be biaxially oriented or oriented in one direction only, before or after coating with the vinylidene chloride copolymer. It may also be heat-set and rendered dimensionally stable so that shrinkage is not more than 0.2% when heated to a temperature of 120° C. for a period of 5 minutes.

In the preferred photographic film base and film, the support is a polymeric alkylene terephthalate containing intralinear units of the formulae:

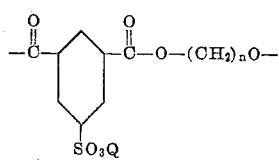

and

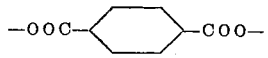

wherein $n$ is 2 to 10 and Q is sodium or potassium.

Suitable reactants for component (c) include 2,5- and 3,5 - di(carbomethoxy)benzenesulfonate, 1,8 - di(carbomethoxy)naphthalene - 3 - sulfonate and 4,4' - di(carbomethoxy)biphenyl-2-sulfonate.

While ethylene glycol is the preferred reactant, any other unsubstituted or alkyl-substituted polymethylene glycol containing 3 to 10 methylene groups or an alicyclic glycol can be used as indicated above. The dicarboxylic acid component can be isophthalic or a mixture of iso- and terephthalic acids. Other suitable acids include adipic, sebacic and hexahydroterephthalic acid. Their corresponding dimethyl and diethyl esters and acid chlorides are also useful.

Examples of ester exchange catalysts which are useful in accordance with the invention, in addition to the preferred zinc acetate dihydrate, include: calcium acetate antimony trioxide, sodium methylate, manganese acetate (anhydrous) or with 2½ $H_2O$, lithium hydride and tetraisopropyl titanate.

In exemplification of the invention a photographic film base can be prepared by admixing a sulfonate of a dicarboxylic acid ester in the form of a metal salt, preferably potassium 3,5-di-carbomethoxy)benzenesulfonate to a dicarboxylic acid ester, preferably dimethyl terephthalate, a polymethylene glycol, preferably ethylene glycol; and an ester interchange catalyst, preferably zinc acetate dihydrate. The quantity of metal salt to total dicarboxylic acid ester can range from 0.25 to 7.5 mole percent, preferably about 2.5 mole percent. The mixture is heated for 3 to 6 hours at a temperature range of from about 160° C. to 210° C. and in the case of dimethyl terephthalate, methanol is distilled off. The pressure is then reduced to about 0.5 mm. of mercury and the temperature is increased to about 250° C. to 300° C., preferably about 275° C. The mixture is heated at that temperature from 1 to 6 hours and glycol is distilled off so that a polymer with an intrinsic viscosity ranging from 0.40 to 0.70, preferably about 0.56 to 0.58 is obtained. A self-supporting film is formed, preferably by melt extrusion and is coated with a layer of a vinylidene chloride copolymer of the type and made by orienting the film biaxially and heating it to a temperature of about 170–190° C., all as described in Alles et al. U.S. Patent 2,627,088. The oriented copolymer-coated film is overcoated with a gelatin layer which, after drying, is coated with a gelatino-silver halide and the photographic film is dried. This photographic film exhibits good dry adherence of all layers to the base with no separation of the substrata and photographic layer from the base. The adherence, moreover, is not altered by photographic processing in conventional aqueous developer, fixer and water baths.

A suitable bifunctional polyester-forming derivative containing metal sulfonate groups, potassium 3,5-di(carbomethoxy)benzenesulfonate, can be prepared as taught in application Ser. No. 622,811 by dissolving 10 parts of 5-sulfoisophthalic acid in 100 parts of methanol (85%)/benzene (15%) solution, to which one part of sulfuric acid is added. A mixture of benzene, water and methanol is slowly distilled off during 24 hours, a constant level of esterification mixture being maintained by continuous addition of methanol/benzene solution. Potassium acetate is added to the reaction mixture and the solid product obtained is filtered off. The product is dissolved in hot water, neutralized with potassium carbonate, and decolorized with charcoal. When the solution is filtered and cooled, a pure product is obtained.

The other reactants for making the films of this invention, e.g., glycols, catalysts, and dimethyl terephthalate are commercially available and are described in Patent 2,465,319. In addition, the raw materials used in the coating operations are also available from commercial sources.

The invention will now be further illustrated by but is not intended to be limited to the following examples. The unmodified monomer described in Example 2 is prepared by ester interchange between dimethyl terephthalate, ethylene glycol in the presence of an ester interchange catalyst as described by Whinfield et al. U.S. Patent 2,465,319.

Example 1

One part by weight of sodium 3,5-di(carbomethoxy)-benzenesulfonate prepared as described above was admixed with 21.2 parts by weight of dimethyl terephthalate, 17.4 parts by weight of ethylene glycol and 0.019 part by weight of zinc acetate dihydrate, the amount of diester sulfonate salt to total dicarboxylic acid esters being about 3 mole percent. The mixture was heated for 4 hours during which time the temperature rose from 180 to 210° C. with evolution of methanol. The pressure was then reduced to 0.5 mm. of mercury and the temperatures increased to 275° C. After 60 minutes, a polymer was obtained which had an intrinsic viscosity, determined in dilute solutions of the polymer in a mixture of 58.8 parts by weight phenol and 41.2 parts by weight trichlorophenol, of 0.50. The polymer was melt-extruded and pressed into a film of a thickness of about 40 mils. A piece of this film was immersed in water with an air bubble placed on the film surface. A contact angle of 62–65° was measured at the interface, polymer film-water-air. A resinous copolymer coating composition (prepared as described in Example 11 of Swindells U.S. Patent 2,698,235, issued December 28, 1954) was applied to the melt-pressed film and the film stretched 3 times each in two directions perpendicular to each other and then heated while still being restrained to a temperature of 175 to 190° C. A coating of gelatin was applied to the stretched film. After drying, a silver halide photographic emulsion coating having gelatin as a binder for the silver halide was coated on the gelatin layer and dried.

The adhesion of the mixed polyester film base to the substrata was measured by making several intersecting cuts through the gelatin emulsion, gelatin and resin subcoating layers into the photographic film base, placing a cellophane pressure-sensitive adhesive tape over the cuts, and sharply pulling the tape back. Upon inspection, no separation of the substrata from the film base was observed. The adhesion was excellent and was not altered by photographic processing in conventional aqueous developer, fixer and water baths. The gelatin coating was uniform on the stretched film.

A control sample of polyethylene terephthalate film was prepared by the procedure described above except that 22 parts by weight dimethyl terephthalate was used but no sodium 3,5-di(carbomethoxy)benzenesulfonate was added. The resulting polymer had an intrinsic viscosity of 0.52, and the melt-pressed film formed had a contact angle of 77–80° measured at the interface, polymer film-water-air, indicating that it had less wettability than the sulfonate containing polyester base. The film was coated and tested as described above. The adhesion of the photographic film substrata to the film base, while adequate, was less satisfactory than that of the sulfonate-containing polyester base of this Example.

Example 2

Ten parts by weight sodium 3,5-di(carbomethoxy)-benzenesulfonate was mixed with 19.7 parts by weight of dimethyl terephthalate, 21.7 parts by weight of ethylene glycol, and 0.025 part by weight of zinc acetate dihydrate, the amount of diester sulfonate salt to total dicarboxylic acid esters being about 25 mole percent. The mixture was heated for 6 hours during which time the temperature rose from 180 to 210° C. with evolution of methanol. One part by weight of the resulting sirupy material was mixed with 3.15 parts by weight of an unmodified "monomer" prepared by ester interchange of dimethyl terephthalate with ethylene glycol in the presence of zinc acetate dihydrate, as in Example 1, and heated to a temperature of 275° C. under a pressure reduced to 0.5 mm. mercury. After 90 minutes, a polymer was obtained having an intrinsic viscosity of 0.45 determined as described in Example 1. The sulfonate-containing polymer was melt-extruded and pressed into a film of about 40-mil thickness. A piece of this film was taken and the contact angle was measured at the interface, polymer film-water-air as described in Example 1. The contact angle measured 54–56°. The film was coated with a vinylidene chloride copolymer and stretched, and a gelatin layer and gelatino-silver halide photographic emulsion layer applied and the resulting photographic film dried, all as described in Example 1. The adhesion of the photographic film substrata to the film base was measured by the method described in said example and was found to be excellent and not affected by photographic processing in conventional aqueous developer, fixer and water baths.

The water-permeable colloid layers are not limited to those specifically listed above. Additional water-permeable colloids having a protective colloid action which can be used include water-soluble polyvinyl alcohol derivatives in general, e.g., partially hydrolyzed polyvinyl acetates, and mixed polyvinyl-chloride-acetates, hydrolyzed interpolymers of vinyl acetate with unsaturated compounds, for example, maleic anhydride, acrylic acid esters, etc. Suitable colloids of the last mentioned types are disclosed in United States Patents 2,276,322, 2,276,323 and 2,397,866. Still other colloids include hydrophilic partially substituted polyvinyl esters and acetals and the low substituted cellulose esters of saturated aliphatic monocarboxylic acids of 2 to 4 carbon atoms and low substituted cellulose ethers, e.g., methylcellulose, ethyl-cellulose, etc. Additional natural colloids include casein, albumin, gum arabic, agar agar, and polyglycuronic acid, etc. which are also anchored to supports by these new substrata.

Various radiation-sensitive materials may be coated onto the anchoring colloid layers of the light-insensitive films made in accordance with this invention. In addition to light-sensitive silver salts, such as silver chloride, silver bromide, silver chloride-bromide, silver chloride-iodide and similar mixtures, there may be utilized bichromated hydrophilic colloids, e.g., albumin, gelatin, gum arabic, polyvinyl alcohols, or glue. The light-sensitive layers, of course, are applied in the absence of actinic radiations. Immobile color formers, dye intermediates or dyes may be present in such layers. Other materials include light-sensitive iron salts and diazonium compounds with or without coupling components. With certain of these light-sensitive materials, e.g., the diazo compounds, the binding agents may have a low sensitivity to water.

An advantage of this invention is that it provides a support film that can be readily wetted and thus uniformly coated with an aqueous dispersion of a vinylidene chloride copolymer and polar liquids. A further advantage is that aqueous gelatin solutions can be uniformly and rapidly coated onto the support film or onto the layer copolymer and excellent adherence to them and to a silver halide emulsion layer is attained.

Still other advantages will be apparent from the foregoing description.

What is claimed is:
1. A photographic material comprising
    (1) A support film composed essentially of a linear carbonyl-oxy polyester composed of repeating ester units wherein the carbonyl-oxy linkages are an integral part of the polymer chain, said polyester being formed by reacting
        (a) At least one compound selected from the group consisting of a dicarboxylic acid of the formula HOOC—Y—COOH and an ester-forming derivative of said dicarboxylic acid, wherein Y is a divalent hydrocarbon radical selected from the group consisting of unsubstituted and alkyl-substituted polymethylene radicals of 1 to 8 carbon atoms, cycloaliphatic radicals of 5 to 6 carbon atoms and aromatic radicals of phenyl and biphenyl,
        (b) at least one dihydroxy compound of the formula HOCH$_2$—W$_n$—CH$_2$OH where W is a divalent hydrocarbon radical selected from the group consisting of unsubstituted and alkyl-substituted polymethylene radicals containing a total of 1 to 8 carbon atoms and cycloaliphatic radicals of 5 to 6 carbons and $n$ is 0 to 1, and
        (c) a metallic salt of the formula

wherein

is a divalent radical selected from the group consisting of an —SO$_3$H substituted arylene radical of 6 to 12 carbon atoms and an —SO$_3$H substituted alkylene radical of 1 to 10 carbon atoms, and R and R' are radicals selected from the group consisting of

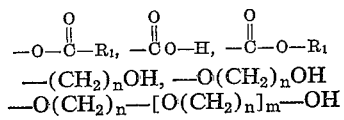

and

where R$_1$ is alkyl of 1 to 4 carbons, $m$ is 1 to 3 and $n$ is 2 to 4; bearing in order over said support,
    (2) at least one layer of a copolymer of vinylidene chloride, an acrylic ester and itaconic acid, said vinylidene chloride being present in an amount of at least 35% by weight of the copolymer, and
    (3) at least one layer of a water-permeable colloid having protective colloid properties, components (a) and (b) constituting 90.0 to 99.5% by weight of the polyester and component (c) constituting 0.5 to 10% by weight of the polyester.

2. A photographic material as defined in claim 1 having on said colloid layer a layer of a light sensitive dispersion of silver halide in a water-permeable organic colloid having protective colloid properties.

3. A photographic material as defined in claim 1 wherein said colloid is gelatin.

4. A photographic material as defined in claim 1 wherein said polyester is a polyethylene terephthalate containing intralinear units of the formula

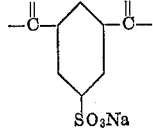

5. A photographic material as defined in claim 1 wherein said vinylidene chloride copolymer is a vinylidene chloride/methyl acrylate/itaconic acid copolymer.

6. A photographic material as defined in claim 1 wherein said divalent radical Y is phenyl.

7. A photographic material as defined in claim 1 wherein component (c) is introduced into said linear polyester through condensation polymerization with components (a) and (b).

References Cited in the file of this patent

UNITED STATES PATENTS

| | | |
|---|---|---|
| 2,244,192 | Flory | June 3, 1941 |
| 2,400,720 | Staudinger et al. | May 21, 1946 |
| 2,698,240 | Alles et al. | Dec. 28, 1954 |
| 2,698,242 | Saner | Dec. 28, 1954 |
| 2,805,173 | Ambler | Sept. 3, 1957 |
| 2,834,793 | Livingston et al. | May 13, 1958 |